US006608588B2

(12) United States Patent
Elam

(10) Patent No.: US 6,608,588 B2
(45) Date of Patent: Aug. 19, 2003

(54) REMOTE SENSING USING RAYLEIGH SIGNALING

(75) Inventor: Carl M. Elam, Perry Hall, MD (US)

(73) Assignee: Greenwich Technologies Associates, Greenwich, CT (US)

( * ) Notice: Subject to any disclaimer, the term of this patent is extended or adjusted under 35 U.S.C. 154(b) by 0 days.

(21) Appl. No.: 09/851,450

(22) Filed: May 7, 2001

(65) Prior Publication Data

US 2002/0021240 A1 Feb. 21, 2002

Related U.S. Application Data

(60) Provisional application No. 60/202,055, filed on May 5, 2000.

(51) Int. Cl.⁷ .............................................. G01S 13/00
(52) U.S. Cl. ........................................ 342/189; 342/145
(58) Field of Search ................................. 342/157, 200, 342/202, 203, 204, 108, 145, 189; 367/100; 375/140–146

(56) References Cited

U.S. PATENT DOCUMENTS

| 3,680,100 A | 7/1972 | Woerrlein |
| 4,965,732 A | 10/1990 | Roy, III et al. |
| 5,260,968 A | 11/1993 | Gardner et al. |
| 5,515,378 A | 5/1996 | Roy, III et al. |
| 5,566,209 A | 10/1996 | Forssen et al. |
| 5,619,503 A | 4/1997 | Dent |
| 5,649,287 A | 7/1997 | Forssen et al. |
| 5,722,083 A | 2/1998 | Konig |
| 5,732,075 A | 3/1998 | Tangemann et al. |
| 5,793,798 A | 8/1998 | Rudish et al. |
| 5,886,988 A | 3/1999 | Yun et al. |
| 5,909,649 A | 6/1999 | Saunders |
| 5,940,742 A | 8/1999 | Dent |
| 6,023,514 A | 2/2000 | Strandberg |
| 6,107,963 A | 8/2000 | Ohmi et al. |
| 6,275,679 B1 | 8/2001 | Elam et al. |

FOREIGN PATENT DOCUMENTS

| EP | 0 893 703 A1 | 1/1999 |
| WO | WO 93/12590 | 6/1993 |

OTHER PUBLICATIONS

Dr. Paul C. Chestnut et al; *Implementation of a Multiple Angle Estimator*; Sep. 23, 1983.
U.S. patent application Ser. No. 09/697,187, Elam, filed Oct. 27, 2000.
Giuli, D. et al., "Radar Target Scattering Matrix Measurement Through Orthogonal Signals," IEE Proceedings– F., vol. 140, No. 4, (Aug. 1, 1993), pp. 233–242.

*Primary Examiner*—Thomas H. Tarcza
*Assistant Examiner*—Brian K Andrea
(74) *Attorney, Agent, or Firm*—Finnegan, Henderson, Farabow, Garrett & Dunner, L.L.P.

(57) ABSTRACT

This invention features an improved technique for search and track surveillance. In this invention, distinct and random (in both space and time) signal beams are simultaneously transmitted from an array of transmitter source elements in a manner to cover all sectors about a source location. In addition, countermeasures against a system according to the invention are difficult because the signal waveforms for each beam are distinct and random, making prediction of any signal waveform for any beam very unlikely. An array of receiver sensor elements is provided to receive signals that are scattered from remote objects and may or may not be co-located with and share the elements of the source array element. The scattered signals are received and processed to yield the direction and range of the remote objects.

56 Claims, 15 Drawing Sheets

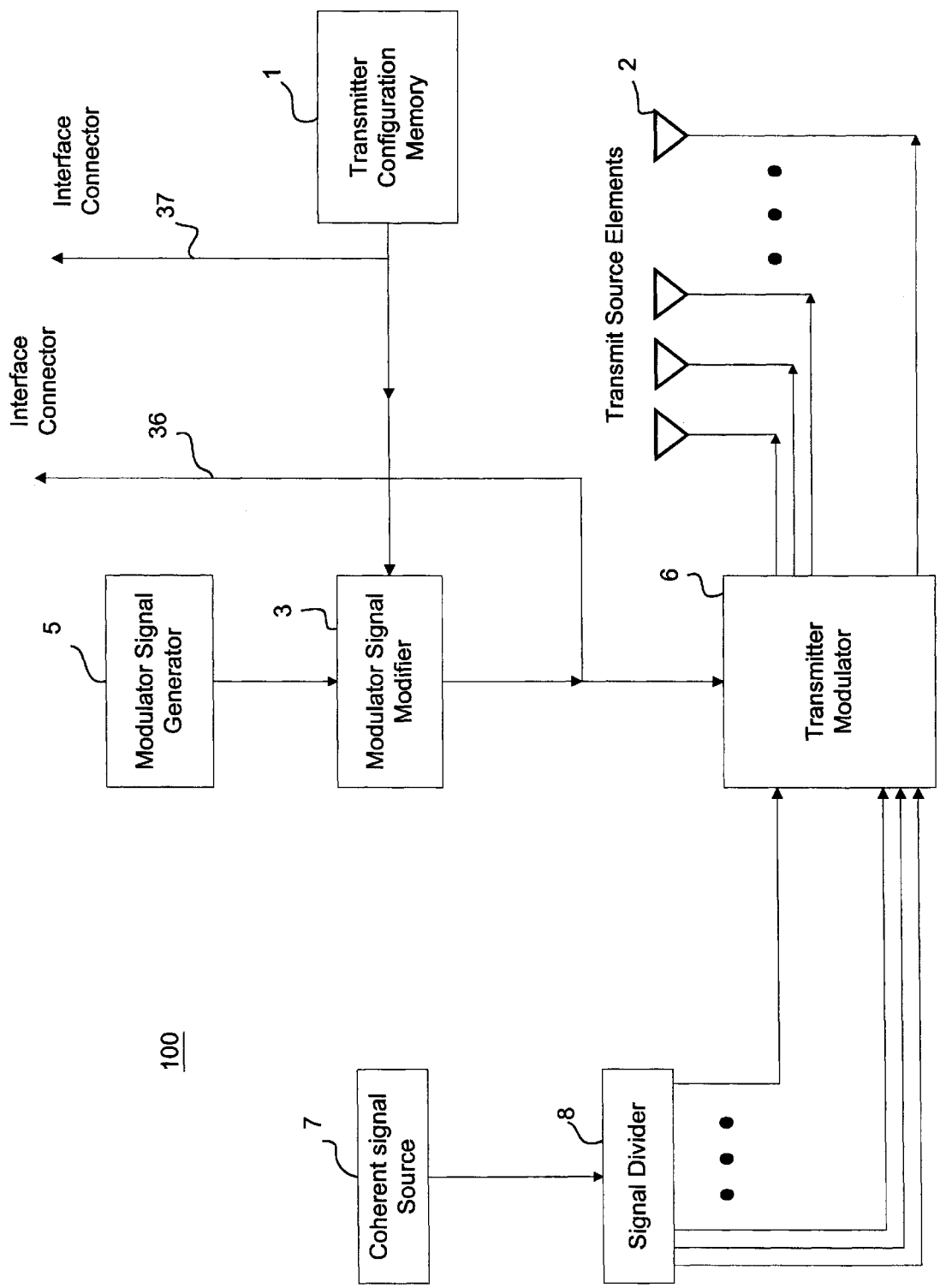

REMOTE SENSING USING RAYLEIGH SIGNALING

CROSS-REFERENCE TO RELATED APPLICATION

This application claims the priority benefit of U.S. Provisional Application No. 60/202,055, filed on May 5, 2000.

DESCRIPTION OF THE INVENTION

1. Field of the Invention

The present invention relates to a method and apparatus for sensing remote objects. More particular, the present invention relates to sensing remotes objects using unique and random signal waveforms in both space and time.

2. Background of the Invention

Current techniques for search and track surveillance use an array of transmitter source elements (e.g., electromagnetic or acoustic) and an array of receiver sensor elements. The array of transmitter source elements generates one or more transmitted signal beams that the array of receiver sensor elements receives by forming beams, the received signals being scattered by remote objects. The received scattered signals are subsequently processed to yield direction and range information of remote objects. In many systems, the array of transmitter source elements and the array of receiver sensor elements share elements within a single array.

In the current techniques, only a limited number of signal beams can be formed simultaneously. Therefore, a remote object space (volume of coverage) must be sequentially scanned sector by sector until the complete remote object space of interest has been thoroughly scanned. A fast moving object traveling through the remote object space can escape detection simply because the signal beam is never directed toward the object at any instant. Also, in the current technique, simple countermeasures may affect the system. This is particularly true if the remote object space is sequentially scanned in the same manner repeatedly using the same signal waveform throughout the object space.

Therefore, there is a need to provide a method and apparatus for forming more beams simultaneously to reduce the likelihood that a remote object will escape detection. There is also a need to provide a method and apparatus for reducing the effects of countermeasures against the apparatus.

SUMMARY OF THE INVENTION

In accordance with the invention, there is provided an apparatus having a transmitter and a receiver for sensing remote objects. The transmitter comprises J transmitter source elements. The apparatus further comprises a source generator for providing J equal carrier signals and a modulator signal generator for generating J statistically independent chip sequences. Each chip sequence comprises a plurality of chips, each chip having a random phase. Still further, the apparatus comprises a modulator for independently modulating the J equal carrier signals with the J statistically independent chips sequences, respectively, to generate J modulated signals. Each modulated signal comprises a plurality of chips, each chip having a random phase. The J modulated signals are transmitted by the J transmitter source elements, respectively, forming a composite signal beam. The transmitter source elements are separated by approximately ½ wavelength.

There is also provided a method for sensing remote objects comprising the steps of generating J equal carrier signals and J statistically independent chip sequences. Each chip sequence comprises a plurality of chips, each chip having a random phase. The method further comprises independently modulating the J equal carrier signals with the J statically independent chip sequences, respectively, to generate J modulated signals and then transmitting the J modulated signals, forming a composite signal beam. Each modulated signal comprises a plurality of chips, each chip having a random phase.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 1 illustrates a transmitter according to the present invention.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

This invention features an improved technique for search and track surveillance that overcomes the limitations described above for current techniques. In this invention, distinct signal beams are simultaneously transmitted from an array of transmitter source elements in a manner to cover all sectors about a source location. In addition, countermeasures against a system according to the invention is difficult because the signal waveforms for each beam is distinct and random (in both space and time), making prediction of any signal waveform for any beam very unlikely. An array of receiver sensor elements is provided to receive signals that are scattered from remote objects and may be co-located with and share the elements of the array of transmitter source elements. The scattered signals are received and processed to yield the direction and range of the remote objects.

Figure 2:
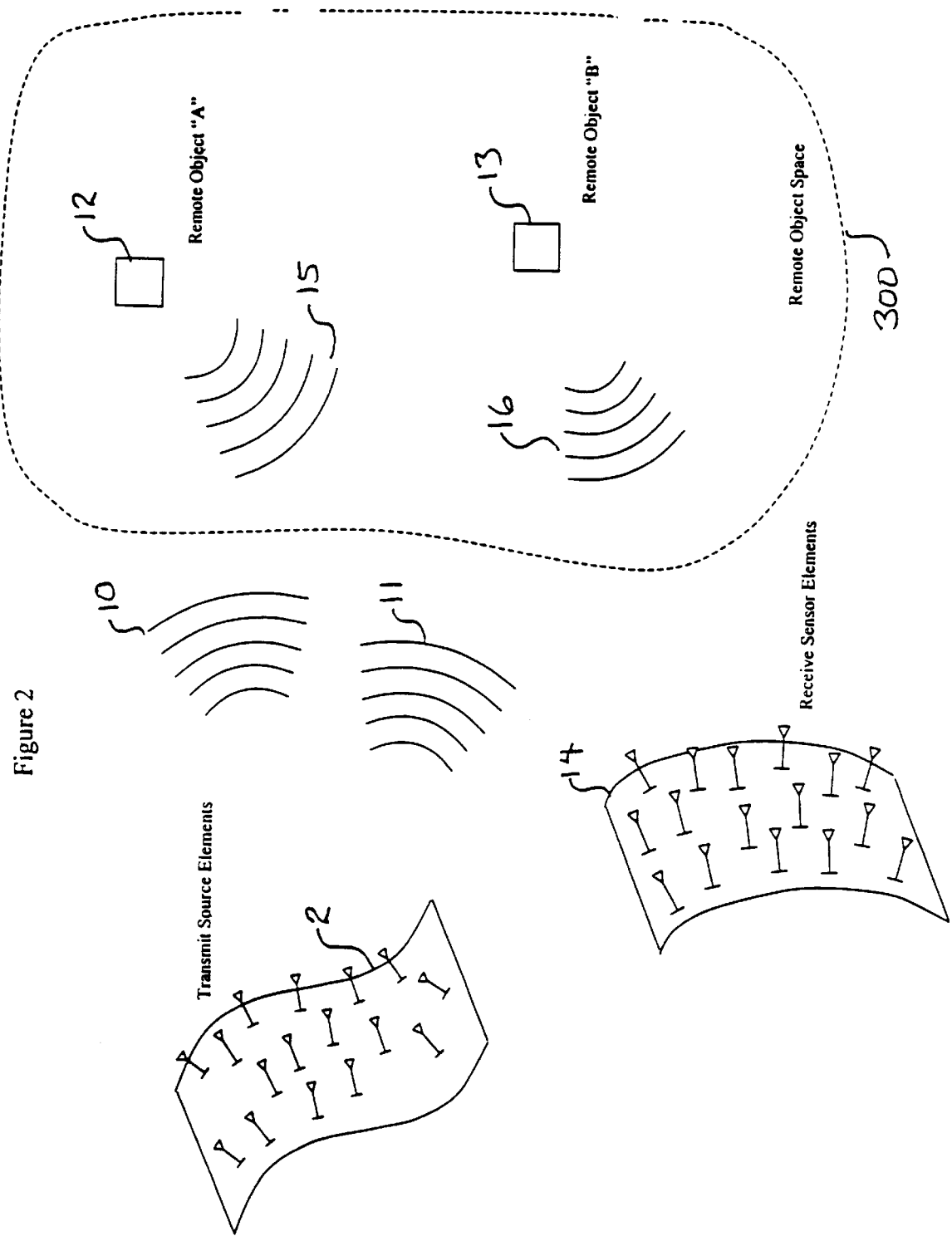
FIG. 2 illustrates a remote object space.

FIG. 2 illustrates an array of transmitter source elements 2 that radiates signals to form composite signals 10 and 11. These signals are reflected by remote objects 12, 13 resulting in scattered signals 15 and 16, which are intercepted by an array of receiver sensor elements 14. The radiated signals from each transmitter source element 2 are each uniquely modulated, as explained in further detail below. The composite signal beam 10 received at remote object 12 is entirely different from the composite signal beam 11 received at remote object 13, provided they are separated by at least one beam-width of the array of transmitter source elements 2.

FIG. 1 illustrates an exemplary transmitter 100 in accordance with the present invention. The transmitter 100 includes a coherent signal source 7, a signal divider 8, a transmitter modulator 6, and transmitter source elements 2. The coherent signal source 7 provides a reference stable carrier signal. The coherent signal source 7 outputs the carrier signal to the signal divider 8. The signal divider 8 divides the carrier signal into multiple signals of equal value, one signal for each transmitter source element 2. The signal divider 8 outputs the multiple signals to the transmitter modulator 6.

Figure 3A:
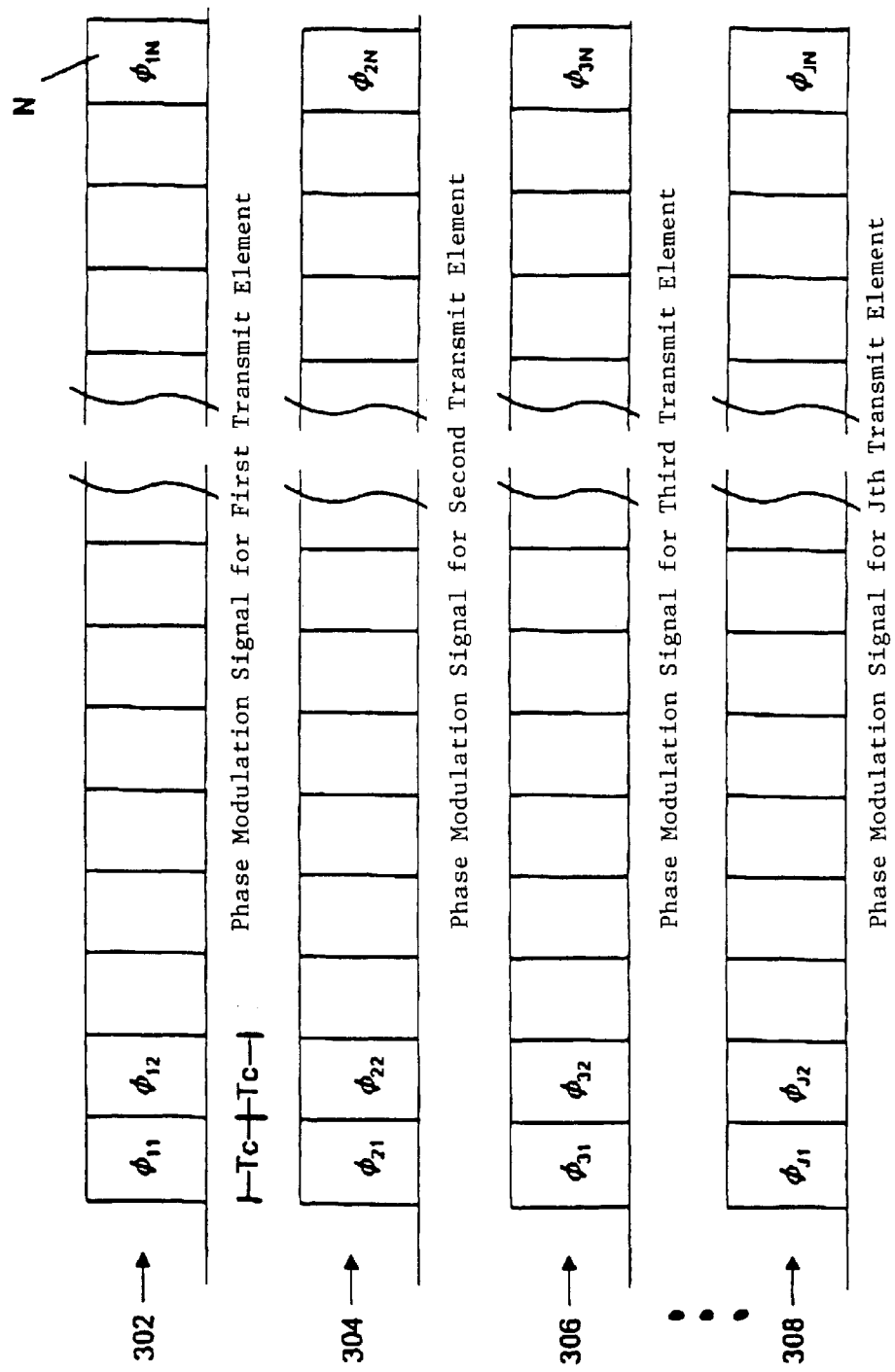
FIGS. 3A–E illustrates various waveforms output by modules in a transmitter or receiver according to the present invention.

A transmitter configuration memory 1 stores information such as the configuration of the transmitter source elements 2, transmission line lengths, and other information that influences amplitude, phase, and polarization of the signals emitted from each transmitter source element 2. The information stored in the transmitter configuration memory 1 may be input to a modulator signal modifier 3, which also receives signals from a modulator signal generator 5. The modulator signal generator 5 defines the signal waveforms applied to the transmitter modulator 6 for each transmitter source element 2. FIG. 3A illustrates signals 302, 304, 306, 308 generated by the modulator signal generator 5, one for each transmitter source element 2. The modulator signal generator 5 generates J signals where the i-th signal has phases $\phi_{i1}, \phi_{i2}, \ldots, \phi_{iN}$ of duration Tc where i=1, 2, . . . , J and J equals the number of transmitter source elements 2. The individual phases of each signal 302, 304, 306, 308 are referred to as "chips."

Figure 3B:
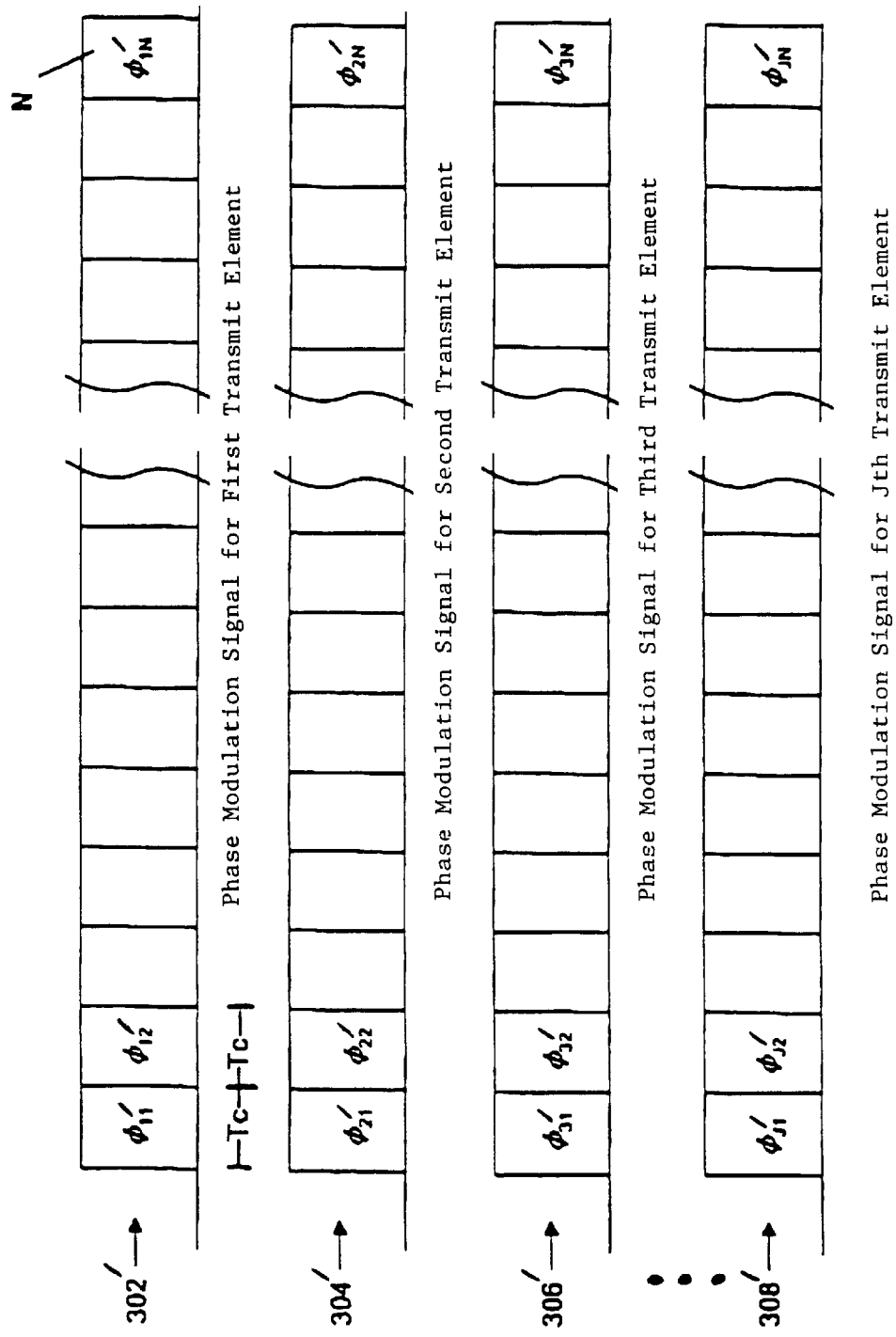

The modulator signal modifier 3 may modify the phase of the signal from the modulator signal generator 5 based on the data from the transmitter configuration memory 1. In general, these values of phase are fixed and non-varying. The values may, for example, be selected by the transmitter configuration memory 1 such that they establish an equivalent planar array with the beam steered in a particular direction. FIG. 3B illustrates signals 302', 304', 306', 308' generated by the modulator signal modifier 3. The output from the modulator signal modifier 3 is input to the transmitter modulator 6. In an alternate embodiment as illustrated by transmitter 101 shown in FIG. 1A, the signals from the modulator signal generator 5 may be input directly to the transmitter modulator 6 without modification by the modulator signal modifier 3.

The following discussion assumes the that the signals generated by modulator signal generator 5 are input directly to the transmitter modulator 6. The transmitter modulator 6 independently modulates each signal output from the signal divider 8 based on the signals output from the modulator signal generator 5 to produce phase modulations. That is, the transmitter modulator 6 phase modulates, or chips, each signal output from the signal divider 8 with one of the signals generated by the modulator signal generator 5. The phase modulated signals are subsequently emitted by the transmitter source elements 2 (i.e., there is one transmitter source element 2 for each modulated signal). For each pulse emitted from the transmitter system 101, the modulator signal generator 5 creates statistically independent chip sequences for each transmitter source element 2. Each transmitter source element 2 is separated from an adjacent transmitter source element 2 by approximately ½ wavelength. The aperture of the array of transmitter source elements 2 determines the beamwidth of the signal beams 10 and 11, shown in FIG. 2.

Figure 1A:
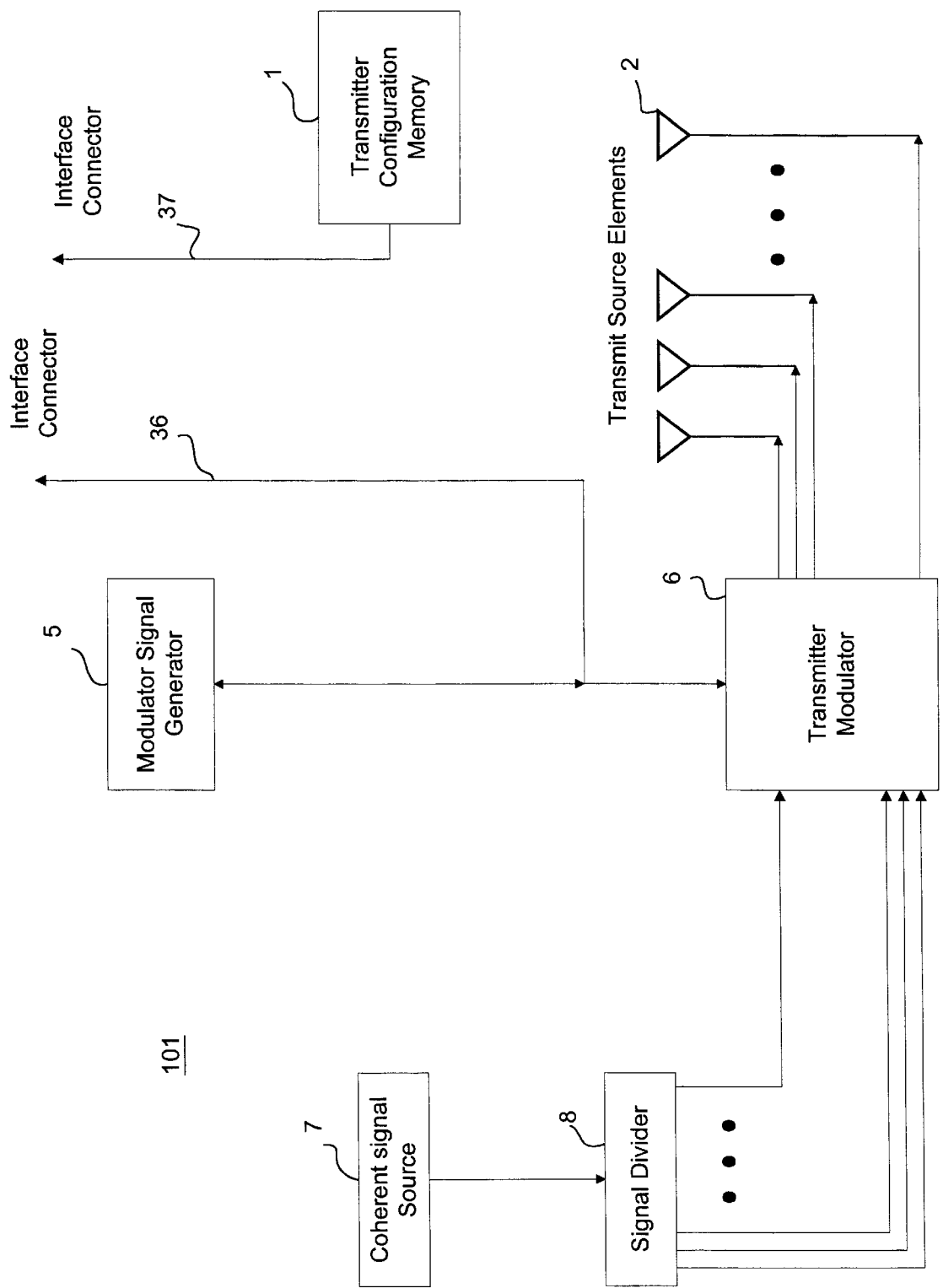
FIG. 1A illustrates an alternate embodiment of a transmitter according to the present invention.
Figure 3C:
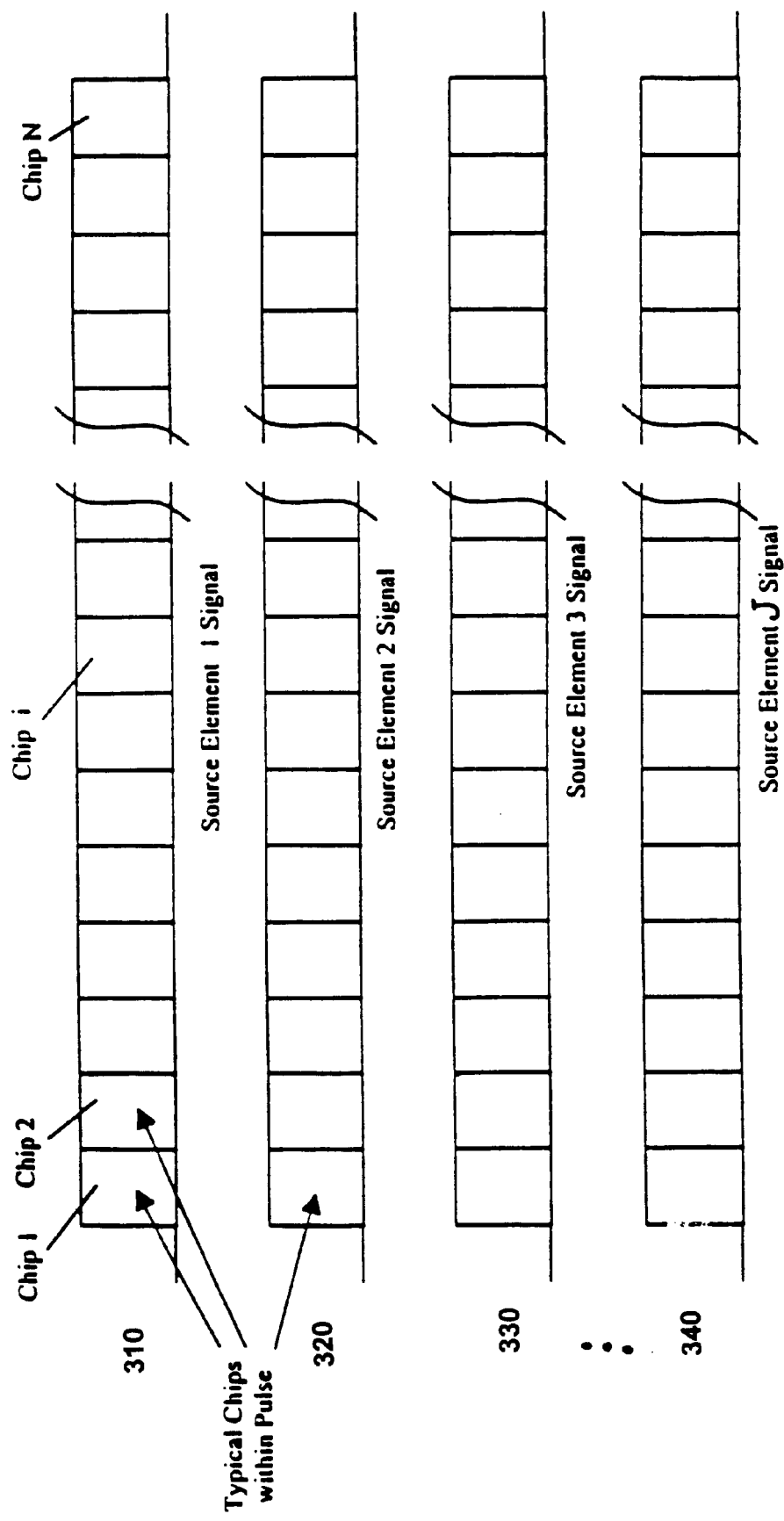

FIG. 3C illustrates typical phase modulated signals 310, 320, 330, 340 output by the transmitter modulator 6 and emitted by the transmitter source elements 2. As mentioned above, the transmitter modulator 6 phase modulates, or chips, each signal output from the signal divider 8 with one of the signals generated by the modulator signal generator 5 (FIG. 1A), which may be modified by the modulation signal modifier 3 (FIG. 1). Each chip of the phase modulated signals 310, 320, 330, 340, equal phase shifted versions of respective signals output from the signal divider 8. For example, using transmitter 101 of FIG. 1A, assume transmitter modulator 6 modulates (or chips) a first signal output from signal divider 8 with signal 302 of FIG. 3A. The resulting signal is signal 310 of FIG. 3C. A first chip of signal 310 equals the first signal output from the signal divider 8 phase shifted by $\phi_{11}$, the second chip of signal 310 equals the first signal phase shifted by $\phi_{12}$, and so on. Similarly, signal 320 of FIG. 3C results from transmitter modulator 6 modulating (or chipping) a second signal output from signal divider 8 with signal 304 of FIG. 3A. A first chip of signal 320 equals the second signal output from the signal divider 8 phase shifted by $\phi_{21}$, the second chip of signal 320 equals the second signal phase shifted by $\phi_{22}$, and so on. Signals 330 through 340 are generated in a similar manner. For transmitter 100, each chip of the phase modulated signals 310, 320, 330, 340 will be phase modulated using the signals 302', 304', 306', 308', illustrated in FIG. 3B. For an electromagnetic system, the modulation of each signal preferably is a pulse of one microsecond in duration containing 50 phase modulated chips, each of a 20 nanosecond duration. In this example, the carrier frequency is $1 \times 10^9$ Hz. For an underwater acoustic system, the modulation of each signal preferably is a pulse of 200 milliseconds in duration containing 50 phase modulated chips, each of four milliseconds duration. In this example, the carrier frequency is 5,000 Hz.

Because of the random nature of the signal waveform chip contributions from each transmitter source element 2, the resultant chip signals at remote object 12 and 13 will conform to a Rayleigh density function. Therefore, each chip at a remote object will tend to be equal in magnitude but different in phase.

In addition to phase modulations, the transmitters 100 and 101 may also impose amplitude and/or polarization modulations on the signals.

Figure 4:
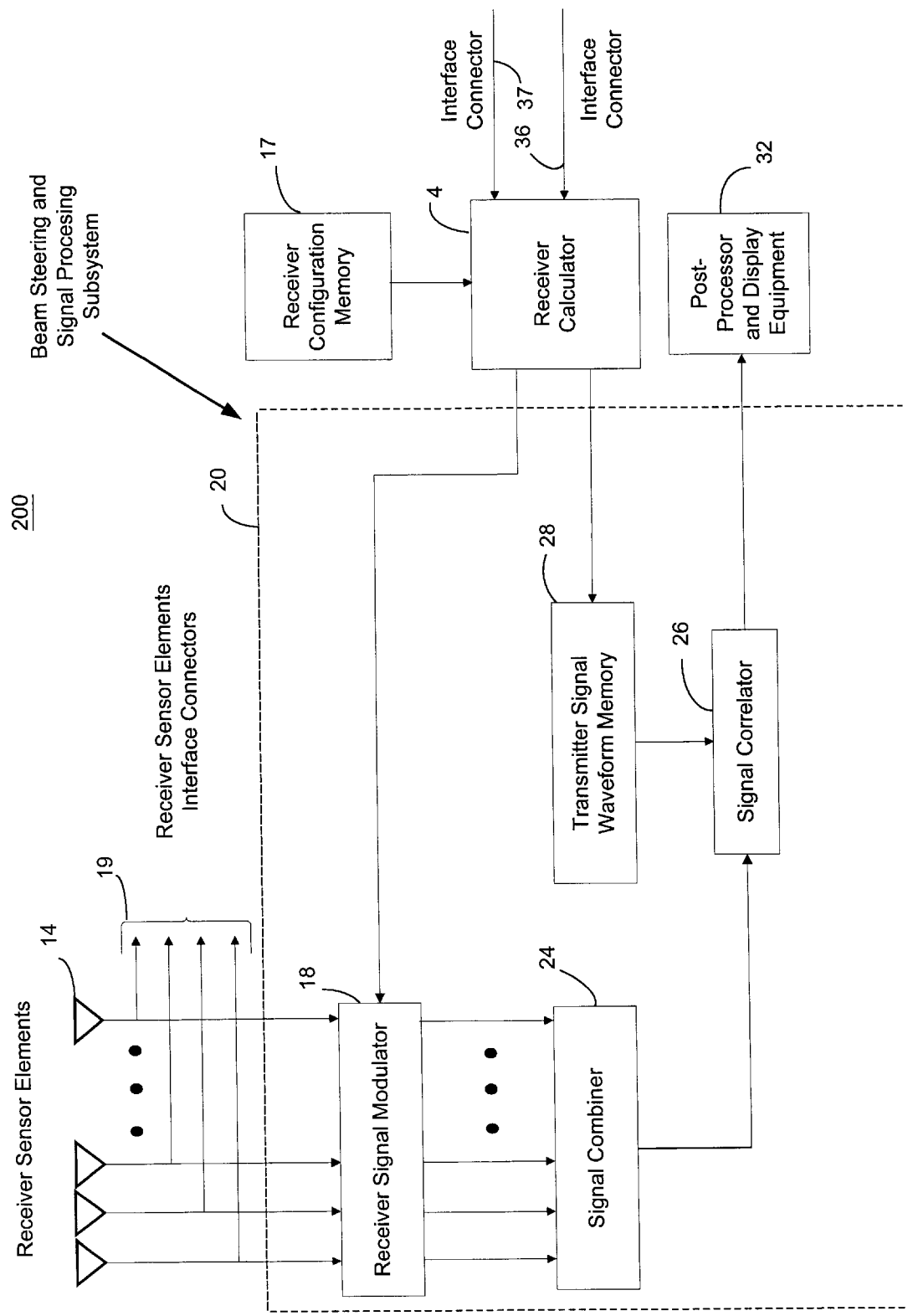
FIGS. 4–8A illustrates various embodiments of a receiver of the present invention.

FIG. 4 illustrates an exemplary receiver 200 in accordance with the present invention. The receiver 200 comprises an array of receiver sensor elements 14, a beam steering and signal processing subsystem 20, a receiver configuration memory 17, a receiver calculator 4, and post-processing and display equipment 32.

As stated above, the receiver sensor elements 14 intercept the scattered signals 15 and 16. The scattered signals 15, 16 are input to the beam steering and signal processing subsystem 20. Since the receiver 200 is capable of simultaneously receiving many signal beams, each receiver sensor element 14 may have an interface connection 19 to interface with multiple beam steering and signal processing subsystems 20.

Each subsystem 20 comprises an receiver signal modulator 18, a signal combiner 24, a signal correlator 26, and a transmitter signal waveform memory 28. The subsystems 20 are normally controlled by the receiver calculator 4 in a manner such that the subsystems 20 operate independently of each other.

The receiver signal modulator 18 performs phase adjustments on the signals received by each receiver sensor element 14 to electrically steer the signals to form a received signal beam in some desired direction. The receiver signal modulator 18 performs beam steering based on beam steering data calculated by the receiver calculator 4. The receiver calculator 4 calculates beam steering data based on data received from the receiver configuration memory 17. The receiver configuration memory 17 stores information such as the configuration of the receiver sensor elements 14, transmission line lengths, and other factors that influence amplitude, phase, and polarization of the signals intercepted by each receiver sensor element 14.

The receiver signal modulator 18 outputs the adjusted received signals to the signal combiner 24. The signal combiner 24 combines the adjusted received signals into a resultant signal waveform and outputs it to the signal correlator 26. The signal correlator 26 performs a cross-correlation between the resultant signal waveform and a transmitter signal waveform stored in the transmitter signal waveform memory 28, described in the following paragraph.

In addition to calculating the data that electrically steers the receiver sensor elements 14, the receiver calculator 4 calculates the transmitter signal waveform stored in the transmitter signal waveform memory 28. The receiver calculator 4 calculates the expected transmitter signal based upon data received from the modulator signal generator 5 and the modulator signal modifier 3 (shown in FIGS. 1 and 1A) via the interface connector 36 and the transmitter configuration memory 1 (shown in FIGS. 1 and 1A) via the interface connector 37. This data allows the receiver calculator 4 to predict the resultant signal in any direction. The receiver calculator 4, therefore, calculates the transmitter signal waveform contained in any transmitter beam that is radiated in any direction in the object space 300 of FIG. 2. When processing a received scattered signal 15 or 16 from a particular beam direction, the receiver calculator 4 calculates the transmitter signal waveform that was transmitted in that direction and outputs that data to the transmitter signal waveform memory 28 for temporary storage.

The output of the signal correlator 26 gives the essential remote object detection signal, which is input to the post-processing and display equipment 32.

In general, the receiver 200 can perform the signal comparison in a number of other manners, such as comparing the various signals from the receiver sensor elements 14 (individually or in any combination) with expected values calculated (individually or in any combination) by the receiver calculator 4. In general, the receiver 200 may utilize any technique for signal comparison that yields satisfactory detection performance.

Figure 5:
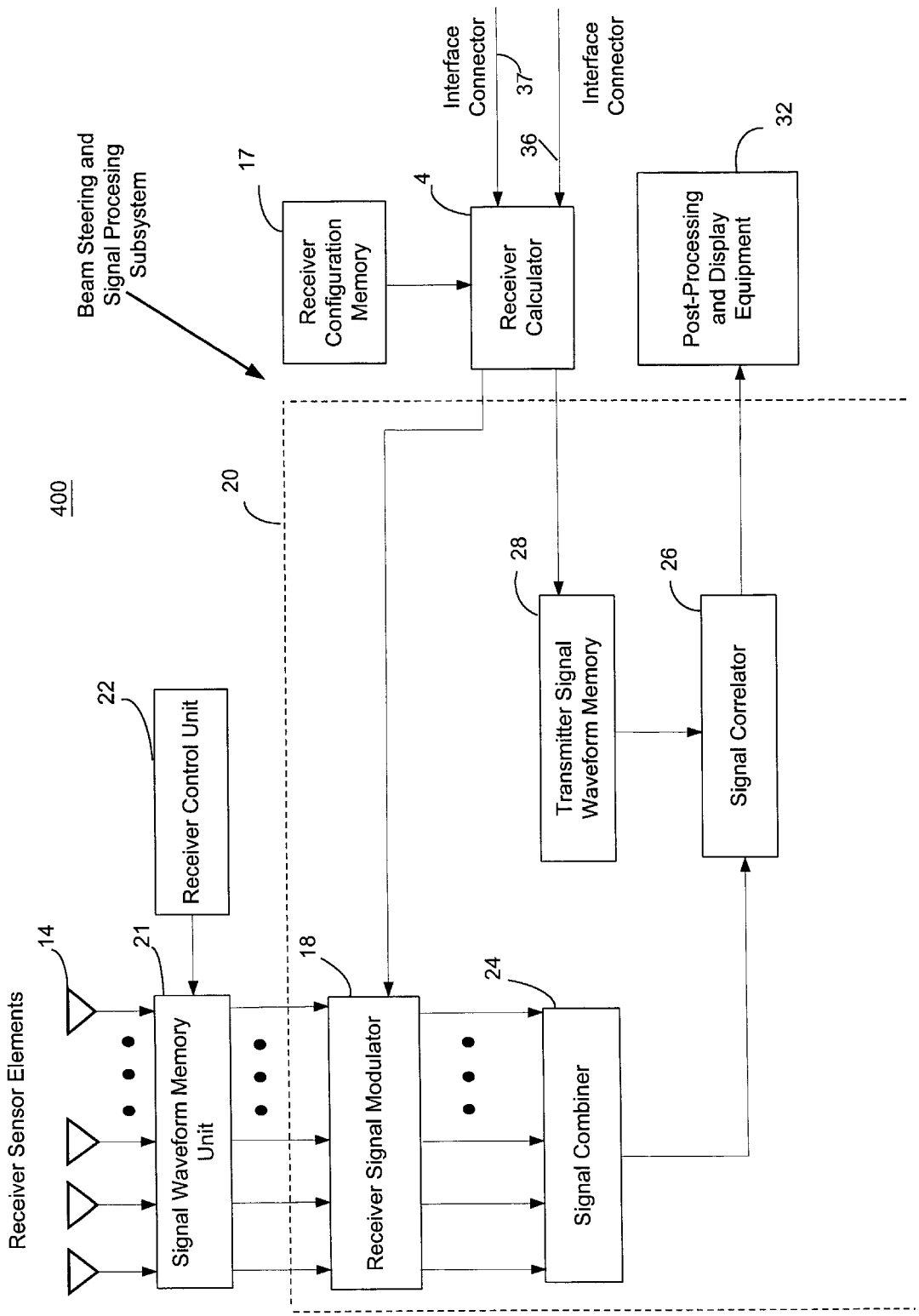

In a second embodiment as illustrated in FIG. 5, receiver 400 further includes a signal waveform memory unit 21 and a receiver control unit 22. The signal waveform memory unit 21 receives inputs from the receiver sensor elements 14 and the receiver control unit 22. The signal waveform memory unit 21 stores a time interval snapshot of the signals received by the receiver sensor elements 14 and subsequently, upon receiving a command from the receiver control unit 22, outputs the received signals to the receiver signal modulator 18. The snapshot may be output multiple times in order to permit the processing of signals for various received signal beam directions using only a single beam steering and processing subsystem 20.

Figure 6:
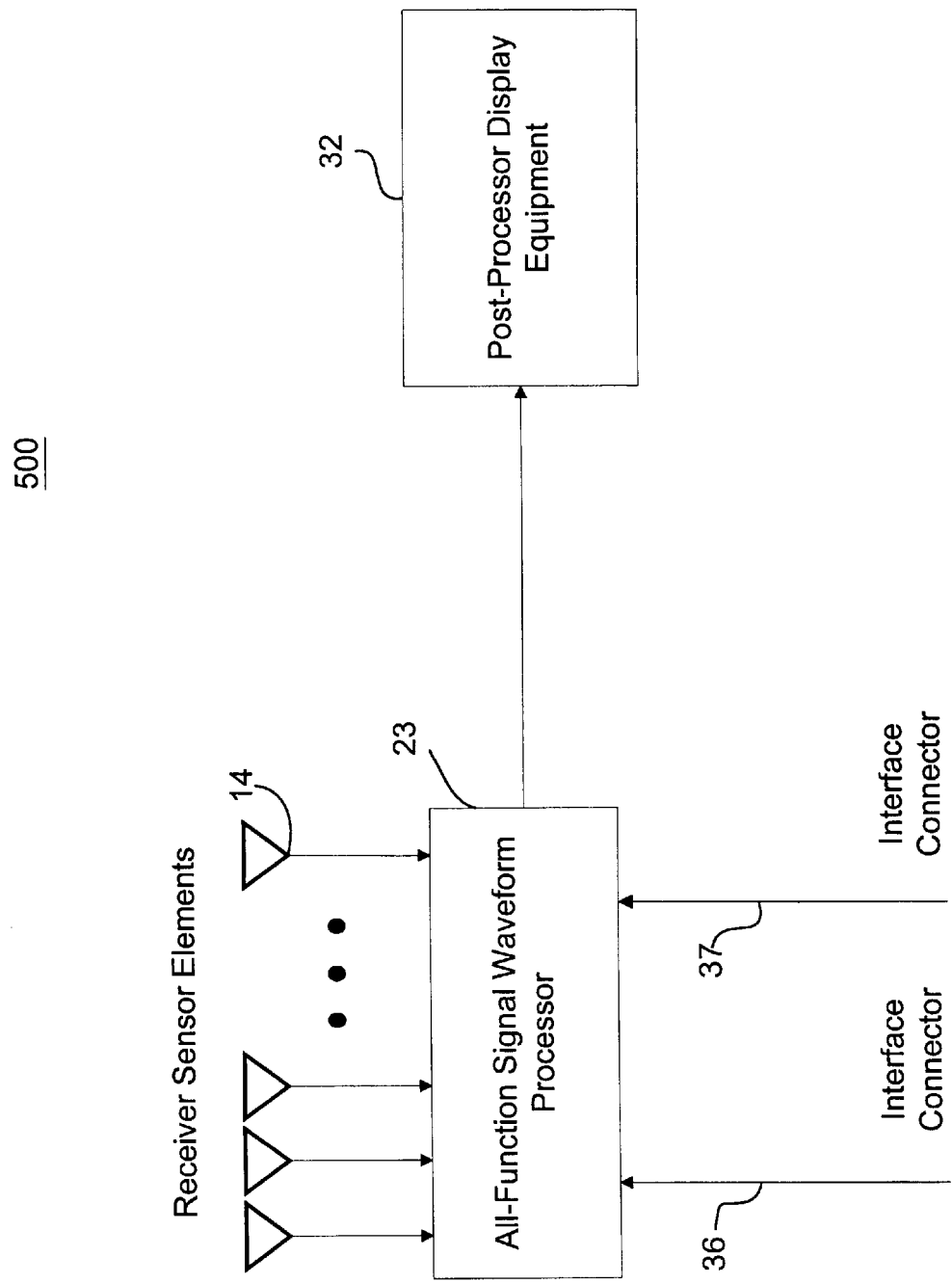

In a third embodiment as illustrated in FIG. 6, a receiver 500 comprises receiver sensor elements 14, an all-function signal waveform processor 23, and a post-processor and display equipment 32. The processor 23 receives inputs from the receiver sensor elements 14 and performs all the function described above and below for the receiver. Receiver 500 can perform the comparison of the transmitter signal with the received signals using the cross correlation techniques described for receivers 200 and 400. In addition, receiver 500 can perform the comparison in a number of manners such as comparing the various signals from receiver sensor elements 14 (individually or in any combination) with expected values calculated by the all-function signal waveform processor 23. In general, receiver 500 may utilize any technique for signal comparison that yields satisfactory detection performance.

Figure 7:
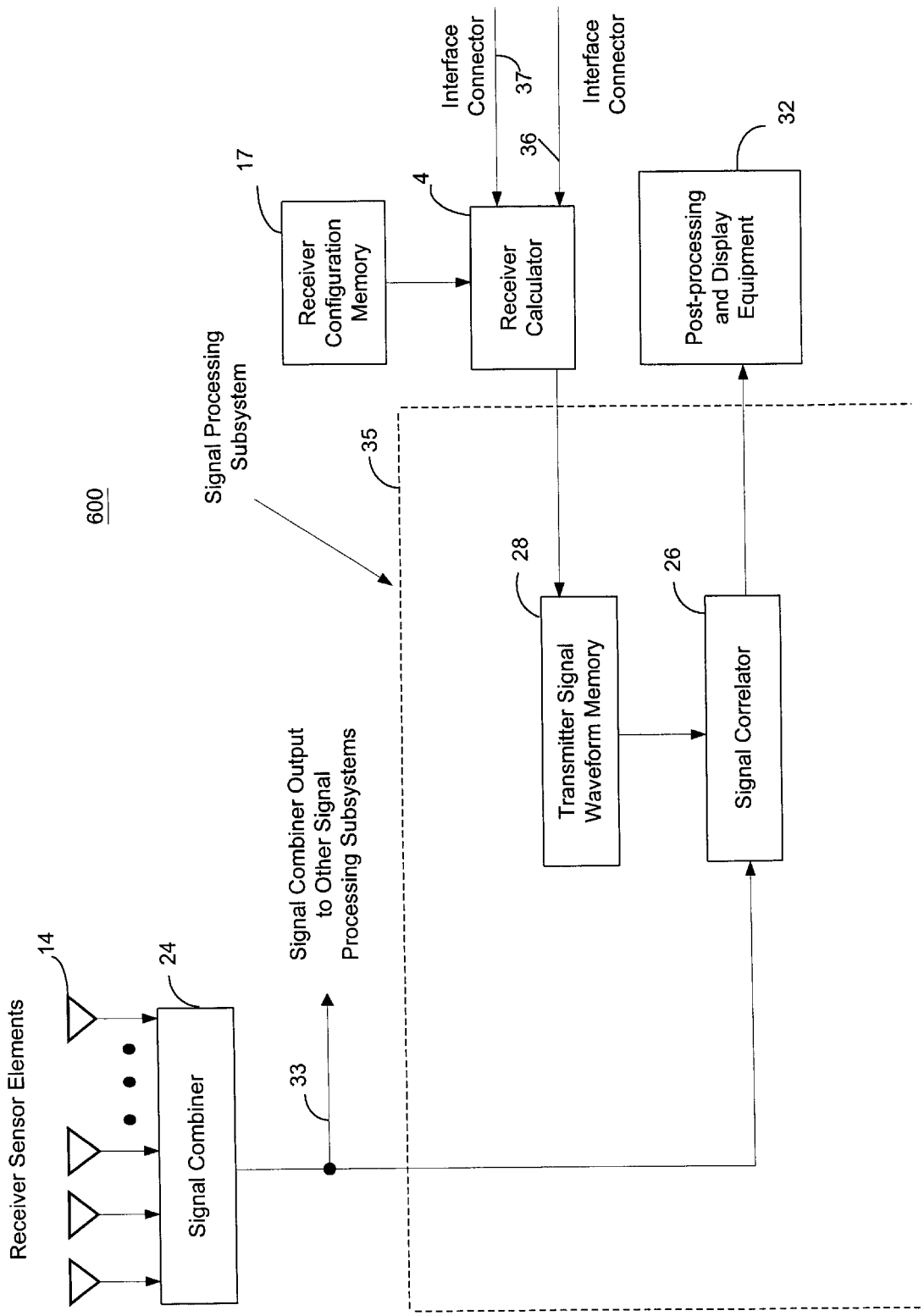

FIG. 7 illustrates a fourth embodiment of the present invention. FIG. 7 illustrates a receiver 600 in which receiver beam steering is inherent in the correlation processing. The receiver sensor elements 14 output their signals directly to the signal combiner 24. In this embodiment, the receiver signal modulator 18 is omitted. The relative phase of the signals received by each receiver sensor element 14 is random for a given incoming wavefront. That is, care is not taken to achieve any particular phase relationship.

Figure 7A:
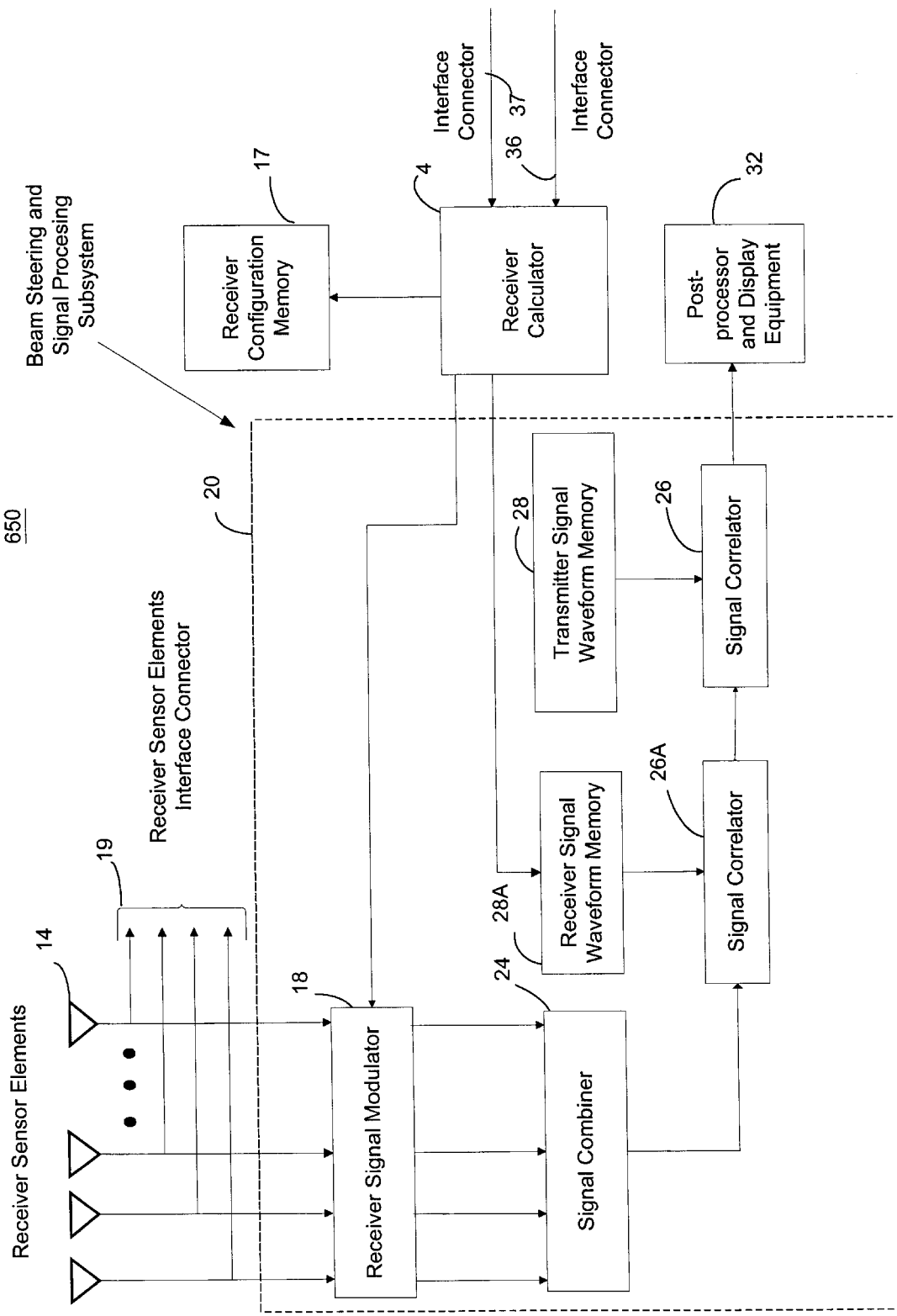

In a fifth embodiment as illustrated in FIG. 7A, the receiver signal modulator 18 randomizes the phases of the signals received by the receiver sensor elements 14. That is, the receiver signal modulator 18 modulates (or chips) the chips of the signals received by each receive sensor element 14 based on random phase settings from the receiver calculator 4. The relative phase of each element is, therefore, random for each incoming signal. That is, care is not taken to achieve any particular phase relationship. The receiver 650 further includes a receiver signal waveform memory 28A and a signal correlator 26A. Receiver beam steering is inherent in the correlation processing.

Figure 3D:
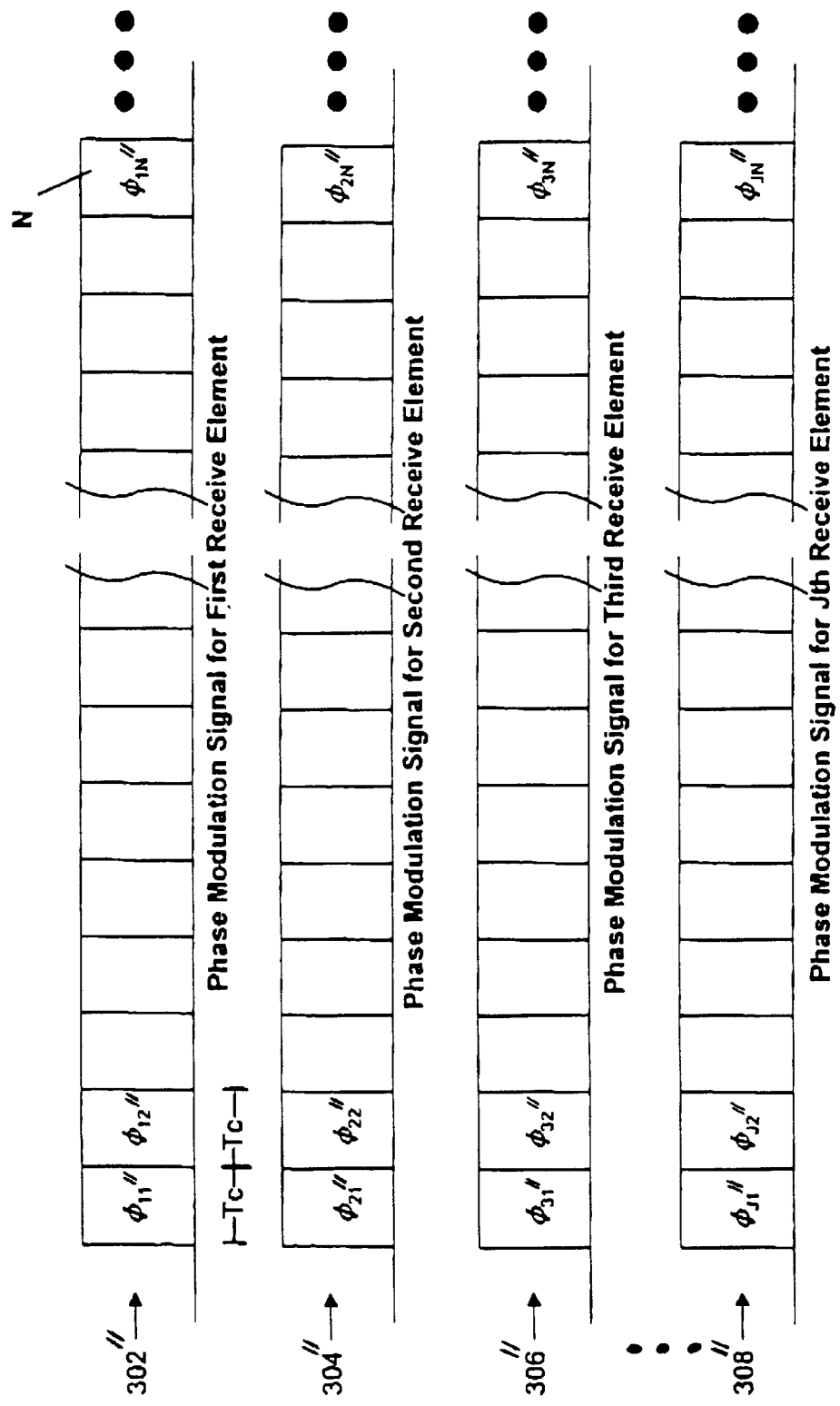

More specifically, in the receiver 650, the receiver calculator 4 generates a plurality of phase modulation signals, as shown in FIG. 3D. The receiver signal modulator 18 individually modulates the signals received by each receiver sensor element 14 based on the plurality of phase modulation signals output from the receiver calculator 4. That is, the receiver signal modulator 18 phase modulates, or chips, each signal output from the receiver sensor element 14 with one of the signals 302", 304", 306", 308" generated by the receiver calculator 4.

Figure 3E:
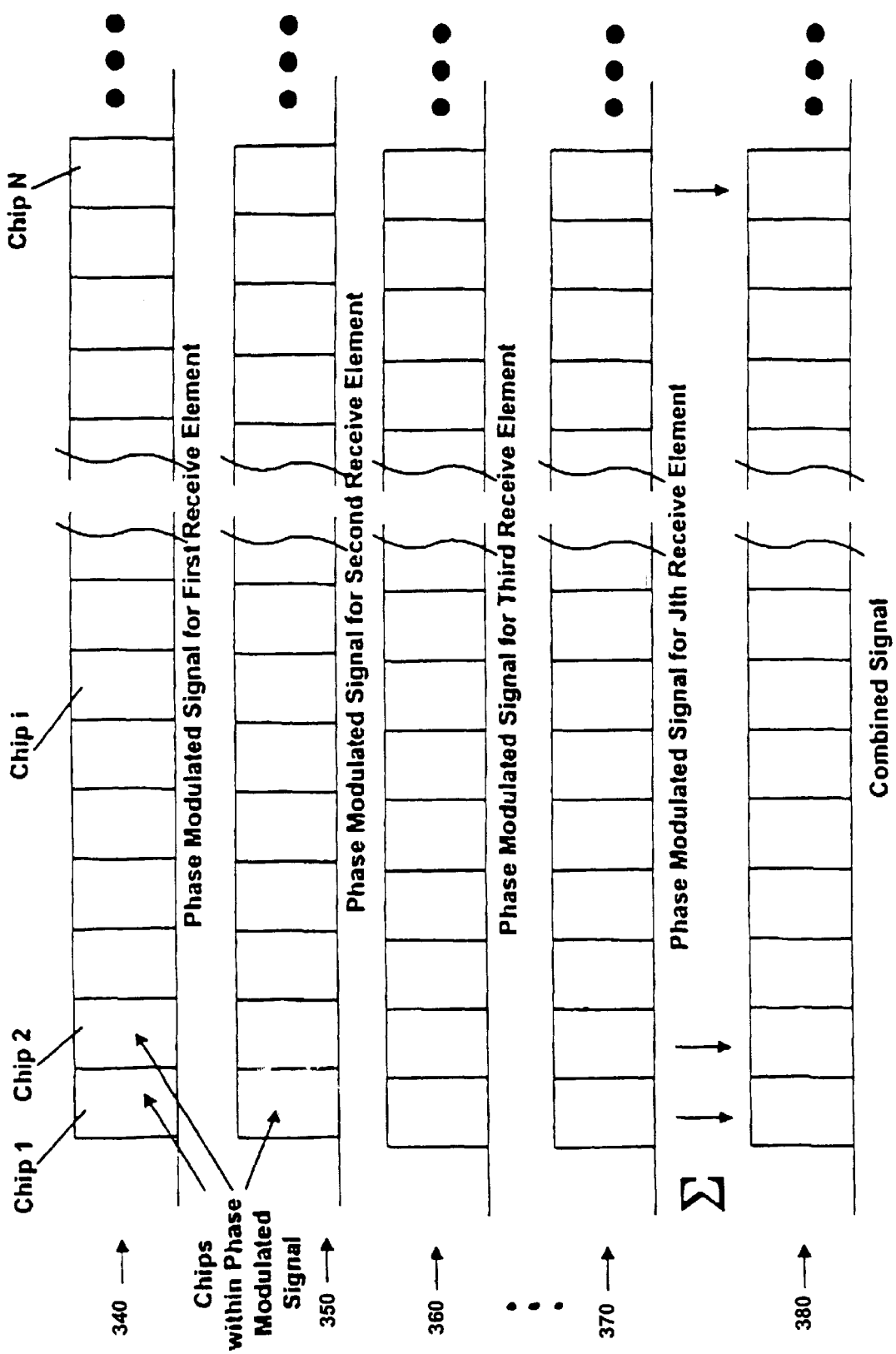

FIG. 3E illustrates typical signals 340, 350, 360, 370 generated by the receiver signal modulator 18 based on the plurality of phase modulation signals 302", 304", 306", 308" from the receiver calculator 4. The chipping rate of the receiver signal modulator 18 is greater than that of the transmitter modulator 6. In one embodiment, the chipping rate of the receiver signal modulator 18 is 50 times greater than the chipping rate of the transmitter modulator 6. To use the receiver 650, the duration of the transmitted chips may be increased, for example, by a factor of 50 to one microsecond for an electromagnetic system with a carrier frequency of $1 \times 10^9$ Hz. For an acoustic system, a corresponding increase in the transmitted chip duration may be required. This increase permits a sufficient number of carrier frequency cycles to reside within each chip created by the receiver. For example, the number of cycles within each chip can be 20. The number of cycles selected for a particular system will depend on the minimum number required for satisfactory correlation processing.

The receiver signal modulator 18 phase modulates each of the signals from the receiver sensor element 14 with one of the signals 302", 304", 306", 308". For example, assume receiver signal modulator 18 modulates (or chips) a first signal output from the receiver sensor elements 14 with signal 302" of FIG. 3D. The resulting signal is signal 340 of FIG. 3E. A first chip of signal 340 equals the first signal output from the receiver sensor elements 14 phase shifted by $\phi''_{11}$, the second chip of signal 340 equals the first signal output from the receiver sensor elements 14 phase shifted by $\phi''_{12}$, and so on. Similarly, signal 350 of FIG. 3E results from receiver signal modulator 18 modulating (or chipping) a second signal output from the receiver sensor elements 14 with signal 304" of FIG. 3D. A first chip of signal 350 equals the second signal output from the receiver sensor elements 14 phase shifted by $\phi''_{21}$, the second chip of signal 350 equals the second signal output from the receiver sensor elements 14 phase shifted by $\phi''_{22}$, and so on. Signals 360 through 370 are generated in a similar manner. The phase modulated signals 340, 350, 360, 370 are input to the signal combiner 24. Signal combiner 24 combines the signals into a combined signal 380, for example, by adding them together. FIG. 3E illustrates a resultant signal 380 formed by adding the phase modulated chips 340, 350, 360, 370.

In addition to generating a plurality of phase modulation signals, the receiver calculator 4, based on information received from the receiver configuration memory 17 and using the phase values within the plurality of phase modulation signals, calculates an expected received signal. The expected received signal is stored in the receiver signal waveform memory 28A. The expected received signal is a signal that the combined signal from the signal combiner 24 is expected to be if an unmodulated carrier was transmitted and scattered by a remote object from a particular direction relative to receiver sensor elements 14. For example, referring to FIG. 2, receiver calculator 4 may generate an expected signal for a carrier signal transmitted and scattered by remote object 13.

The combined signal from the signal combiner 24 and the expected signal from the receiver signal waveform memory 28A are output to the signal correlator 26A, which correlates the two signals. The correlated signal is input to a second signal correlator 26, where it is correlated with an expected transmitter signal stored in the transmitter signal waveform memory 28. The receiver calculator 4 calculates the expected transmitter signal based on data received from the modulator signal generator 5 and the modulator signal modifier 3 (shown in FIGS. 1 and 1A) via the interface connector 36 and the transmitter configuration memory 1 (shown in FIGS. 1 and 1A) via the interface connector 37. The expected transmitter signal is a signal that is expected to arrive from a desired direction. This desired direction of the expected transmitter signal may be the direction of signal arrival that the expected receiver signal output from the receiver calculator 4 to receiver signal waveform memory 28A is based upon.

The teachings disclosed in U.S. patent application Ser. No. 09/697,187 filed on Oct. 27, 2000 by Carl Elam, which is incorporated by reference, may be used in the present invention.

Figure 8:
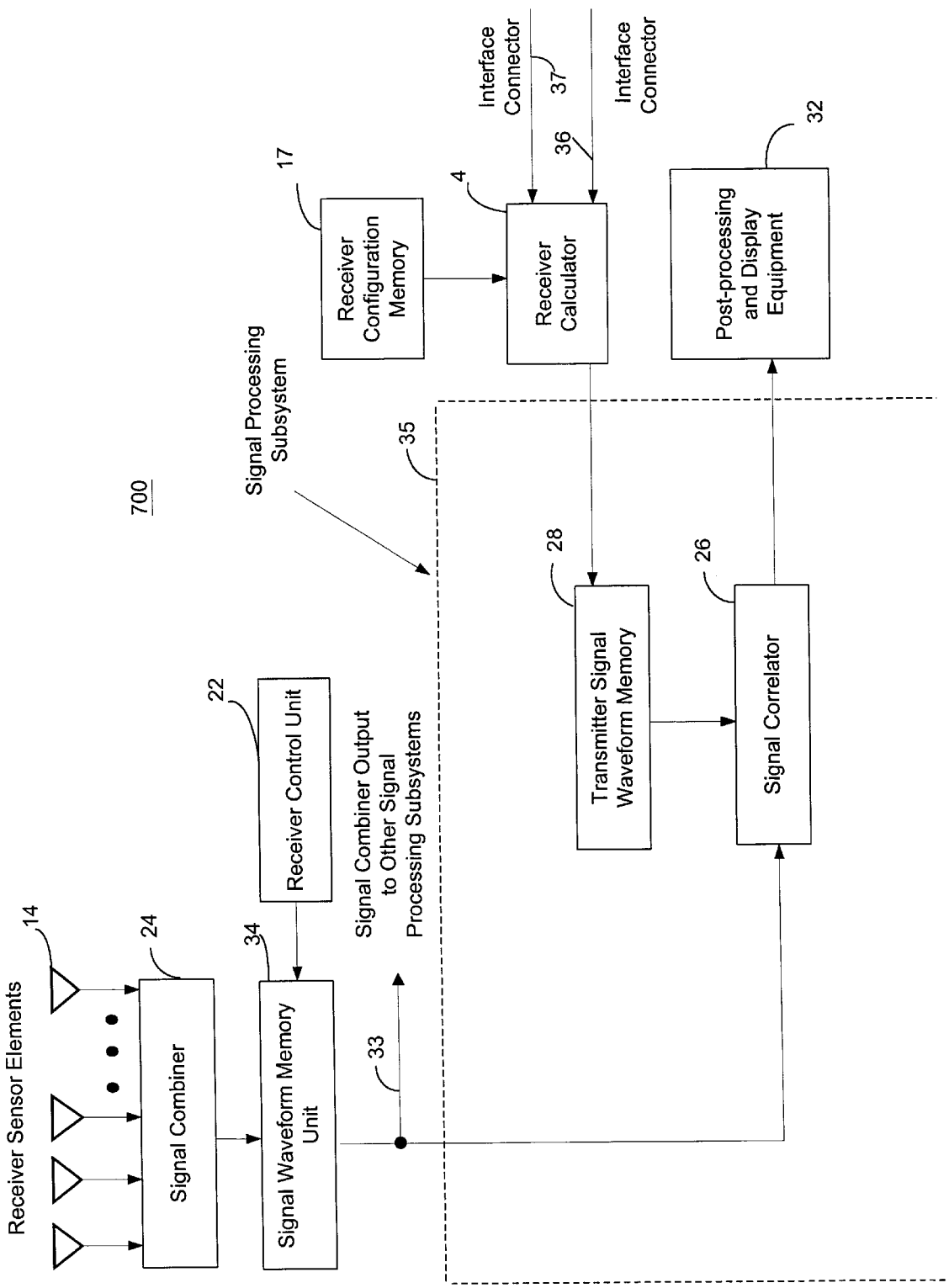

In a sixth embodiment as illustrated in FIG. 8, the receiver sensor elements 14 output their signals directly to the signal combiner 24 which combines the signals and outputs the resultant signal waveform to the signal waveform memory 34. The signal waveform memory 34 stores a time interval snapshot of the resultant signal waveforms and subsequently, upon command from the receiver control unit 22, outputs the received signal waveforms to the signal correlator 26 for processing. The receiver signal modulator 18 is omitted and the receiver beam steering is inherent in the correlation processing, as in receiver 600.

Figure 8A:
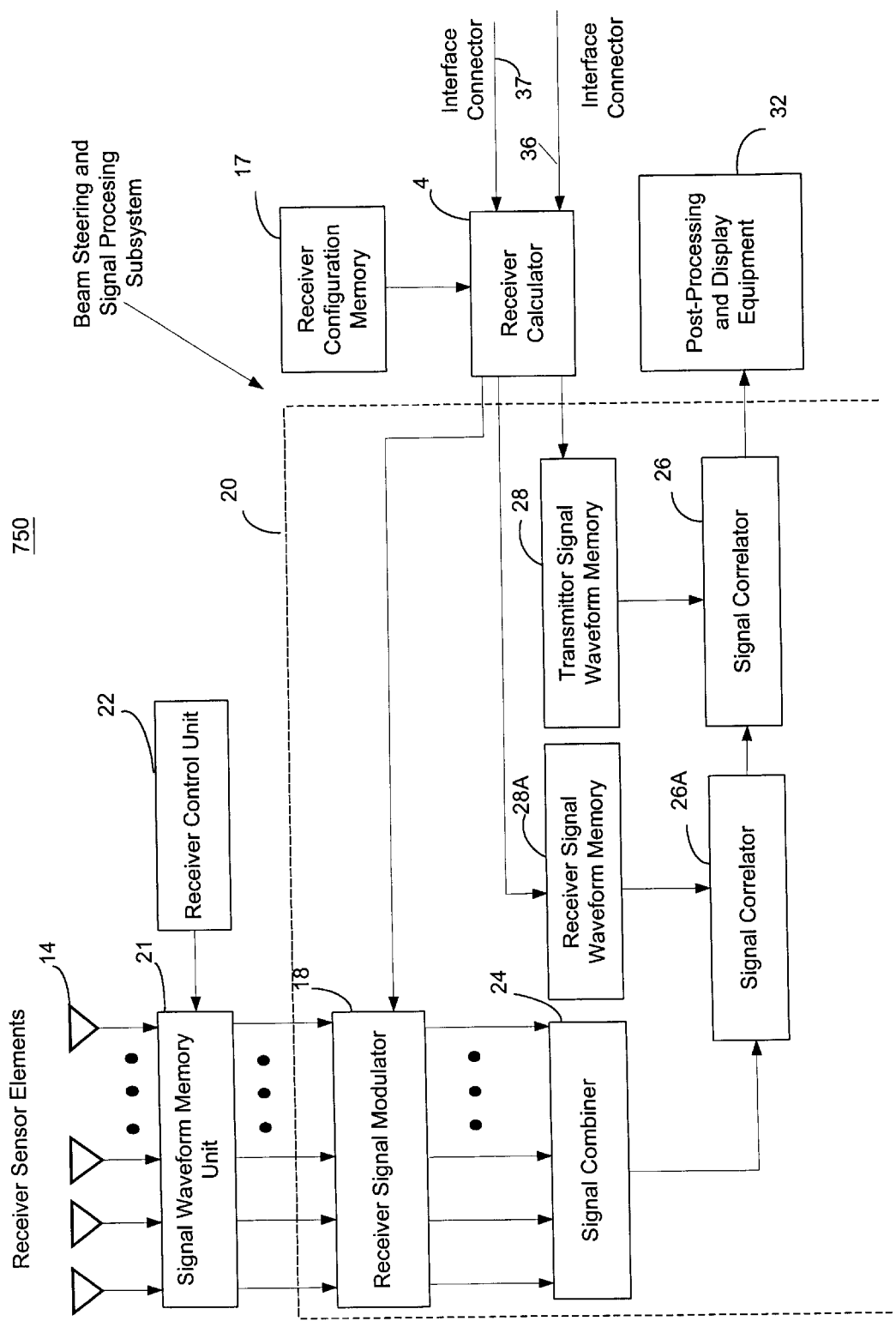

FIG. 8A illustrates a seventh embodiment of the present invention. In receiver 750, the signal waveform memory unit 21 receives inputs from the receiver sensor elements 14 and receiver control unit 22. The signal waveform memory 21 stores a time interval snapshot of the received signal waveforms and subsequently, upon command from the receiver control unit 22, outputs the received signal waveforms to the receiver signal modulator 18, signal combiner 24, and signal correlators 26A and 26 for processing. The receiver beam steering is inherent in the correlation processing, as in receiver 650 illustrated in FIG. 7A. The receiver signal modulator 18 randomizes the phases of the signals received by receiver sensor elements 14, similar to receiver 650 in FIG. 7A. That is, the receiver signal modulator 18 modulates (or chips) the chips of the signals received by each receive sensor element 14 based on random phase settings from the receiver calculator 4. Each time a snapshot is output from signal waveform memory unit 21 and processed, the random phase settings of the receiver signal modulator 18 may be changed by the receiver calculator 4. This, of course, requires a revision of the data contained in the receiver signal waveform memory 28A prior to performing the first cross correlation.

The physical size of a transmitter array or a receiver array may be small compared with the length of a transmitted chip propagating in the medium being utilized.

The receiver correlator 26 has a processing gain of: $\sqrt{N}/1$ where "N" is the number of chips in a single transmitted signal pulse waveform. The transmitter 100 or 101 sends out chipped signal pulses that may typically contain 50 chips. The value for processing gain is established as follows:

A transmitted and received signal pulse containing N chips will have a correlation energy expression of:

$$R_{TR}(\tau, \theta) = \int_{-\infty}^{+\infty} \{\vec{v}_T(t)\} \cdot \{\vec{v}_R(t+\tau)e^{+j\theta}\} dt$$

where $\vec{v}_R(t+\tau)$ is the received pulse comprised of N chips and $\vec{v}_T(t)$ is the corresponding transmitted pulse also comprised of N chips. Each chip of both $\vec{v}_R(t+\tau)$ and $\vec{v}_T(t)$ has a mean square value of $\alpha_R^2$ and $\alpha_T^2$ respectively, or an r.m.s. value of $\alpha_R$ and $\alpha_T$, respectively. Each chip of both $\vec{v}_R(t+\tau)$ and $\vec{v}_T(t)$ is a random vector which conforms to a Rayleigh density function each with random phase and expected magnitude values of $$\frac{\sqrt{\pi \alpha_R^2}}{2} \text{ and } \frac{\sqrt{\pi \alpha_R^2}}{2}$$

respectively. The random vectors are composed of the resultant random phase signals from the transmitted source elements 2. The phase shift term $e^{+j\theta}$, within the correlation integral, is applied equally to all chips of a received pulse where the parameter $\theta$ is chosen to maximize the correlation output for each received pulse that is processed.

The magnitude of the correlation energy of N chips, which are well correlated, will be $$N(\alpha_R)(\alpha_T)\left(\frac{T}{N}\right),$$

where $$\left(\frac{T}{N}\right)$$

is the time interval of a single chip.

If on the other hand, the received signal pulse chips are random with respect to the transmitted signal pulse chips, the magnitude of the correlation energy of the N chips will be $$\sqrt{N} (\alpha_R)(\alpha_T)\left(\frac{T}{N}\right).$$

In this case, the N received vectors, represented by the received chips, will have random phases with respect to their corresponding N transmitted vectors represented by the transmitted chips. The sum of N random vectors (with r.m.s.

value of $\alpha_R$) is two dimensional Gaussian (with r.m.s. value of $\sqrt{N}\alpha_R$) This two dimensional Gaussian density function may also be described as a Rayleigh density function.

The value for processing gain is found by forming a ratio of the correlator output for a well correlated signal $$N(\alpha_R)(\alpha_T)\left(\frac{T}{N}\right)$$

and an uncorrelated signal $$\sqrt{N}\,(\alpha_R)(\alpha_T)\left(\frac{T}{N}\right).$$

The previous expression for correlator output was for a stationary object. If the object has a radial velocity with respect to the apparatus, then the expression will become:

$$R_{TR}(\tau, \theta) = \int_{-\infty}^{+\infty} \{\vec{v}_T(t)\} \cdot \{\vec{v}_R(t+\tau)e^{+j\theta}e^{+jw(t+\tau)}\}dt$$

Where the term $e^{+jw(t+\tau)}$ is a simplified phase shift term that accounts for the alteration in the phase of the received signal chips due to a doppler frequency shift $\omega$. It will be noted that the doppler frequency shift will cause an ever increasing (or decreasing) phase shift in each successive chip of a received signal pulse.

If the receiver correlation processing neglects the doppler frequency shift, the resultant effect will be partial or total decorrelation of otherwise correlated signals.

For an electromagnetic signal with a carrier frequency of $1\times10^9$ Hz and a pulse length of one microsecond, the radial velocity that will cause complete decorrelation is 1 million feet/second. A velocity of about 1/10th that value (100,000 feet/second) should only slightly degrade the correlation output. The value of this velocity that will cause decorrelation will depend upon the transmitter signal parameters of carrier frequency and the pulse duration.

Those skilled in the art may utilize well known technology to compensate for doppler effects in the correlation processing. One such technique is to introduce a compensating phase term in the correlation processing as illustrated in the following expression:

$$R_{TR}(\tau, \theta) = \int_{-\infty}^{+\infty} \{\vec{v}_T(t)\} \cdot \{\vec{v}_R(t+\tau)e^{+j\theta}e^{+jw(t+\tau)}e^{-je(t+\tau)}\}dt$$

The term $e^{-jw(t+\tau)}$ is a processor compensating term that will remove the effects of the received doppler phase shift term $e^{+jw(t+\tau)}$.

For an underwater acoustic signal with a carrier frequency of 5,000 Hz and a pulse length of 200 milliseconds, the radial velocity that will cause complete decorrelation is five feet/second. This velocity will depend upon the transmitter signal parameters of carrier frequency and the pulse duration. Those skilled in the art may utilize well known technology to compensate for these doppler effects in the correlation processing. One such technique, as described above, is to introduce a compensating phase term in the correlation processing.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus having a transmitter and a receiver for sensing remote objects, wherein the transmitter comprises J transmitter source elements, the apparatus comprising:
   a source generator configured to provide J carrier signals;
   a modulator signal generator configured to generate J statistically independent chip sequences, wherein each chip sequence comprises a plurality of chips, each chip having a random phase; and
   a modulator configured to independently modulate the J carrier signals with the J statistically independent chip sequences, respectively, to generate J modulated signals, wherein each modulated signal comprises a plurality of chips, each chip having a random phase.

2. The apparatus according to claim 1, wherein the J modulated signals are transmitted by the J transmitter source elements.

3. The apparatus according to claim 1, wherein the source generator includes:
   a generator configured to provide a stable carrier signal; and
   a signal divider configured to divide the stable carrier signal into the J carrier signals.

4. The apparatus according to claim 1, wherein the J modulated signals are transmitted by the J transmitter source elements and scattered by remote objects and wherein the receiver shares the J transmitter source elements to receive the scattered modulated signals transmitted by the transmitter.

5. The apparatus according to claim 4, wherein the receiver further comprises one or more processing elements configured for one or more directions of interest to perform beamforming on the received scattered modulated signals and signal comparison.

6. The apparatus according to claim 5, wherein each of the processing elements comprises:
   a receiver modulator configured to adjust the received scattered modulated signals to form adjusted signals;
   a signal combiner configured to combine the adjusted signals to form a resultant signal; and
   a correlator configured to compare the resultant signal and a predicted transmitted signal.

7. The apparatus according to claim 4, wherein the receiver further comprises:
   a storage element configured to store snapshots of the received scattered modulated signals and output the stored signals multiple times; and
   a processing element configured to perform, for each direction of interest, beamforming on the stored signals and signal comparison.

8. The apparatus according to claim 7, wherein the processing element comprises:
   a receiver modulator configured to adjust the received scattered modulated signals to form adjusted signals;
   a signal combiner configured to combine the adjusted signals to form a resultant signal; and
   a correlator configured to compare the resultant signal and a predicted transmitted signal.

9. The apparatus according to claim 4, wherein the receiver further comprises:
   a signal combiner configured to combine the received scattered modulated signals to form a resultant signal; and
   one or more processors configured for one or more directions of interest to perform beamforming while performing signal comparison between the resultant signal and a predicted transmitted signal.

10. The apparatus according to claim 4, wherein the receiver further comprises:
   a signal combiner configured to combine the received scattered modulated signals to form a resultant signal;
   a storage element configured to store snapshots of the resultant signal and output the stored resultant signal multiple times; and
   a processor configured to perform, for each direction of interest, beamforming while performing signal comparison between the resultant signal and a predicted transmitted signal with a signal processing means.

11. The apparatus according to claim 4, wherein the receiver further comprises one or more processors configured for one or more directions of interest to randomize phases of the received scattered modulated signals and to perform signal comparison.

12. The apparatus according to claim 11, wherein each of the processing elements comprises:
   a receiver modulator configured to randomize phases of the received scattered modulated signals to form adjusted signals;
   a signal combiner configured to combine the adjusted signals to form a resultant signal;
   a first correlator configured to compare the resultant signal and a predicted received signal to form a first correlated signal; and
   a second correlator configured to compare the first correlated signal and a predicted transmitted signal.

13. The apparatus according to claim 4, wherein the receiver further comprises:
   a storage element configured to store snapshots of the received scattered modulated signals and output the stored signals multiple times; and
   a processing element configured to randomize phases of the received signals and to perform signal comparison, for each direction of interest.

14. The apparatus of claim 13, wherein the processing element comprises:
   a receiver modulator configured to randomize phases of the stored signals to form adjusted signals;
   a signal combiner configured to combine the adjusted signals to form a resultant signal;
   a first correlator configured to compare the resultant signal and a predicted received signal to form a first correlated signal; and
   a second correlator configured to compare the first correlated signal and a predicted transmitted signal.

15. The apparatus according to claim 1, wherein the J modulated signals are transmitted by the J transmitter source elements and scattered by remote objects and wherein the receiver includes receiver sensor elements separate from the transmitter source elements to receive the scattered modulated signals transmitted by the transmitter.

16. The apparatus according to claim 15, the receiver further comprises one or more processors configured for one or more directions of interest to perform beamforming on the received scattered modulated signals and signal comparison.

17. The apparatus according to claim 16, wherein each of the processing elements comprises:
   a receiver modulator configured to adjust the received scattered modulated signals to form adjusted signals;
   a signal combiner configured to combine the adjusted signals to form a resultant signal; and
   a correlator configured to compare the resultant signal and a predicted transmitted signal.

18. The apparatus according to claim 15, wherein the receiver further comprises:
   a storage element configured to store snapshots of the received scattered modulated signals and output the stored signals multiple times; and
   a processing element configured to perform, for each direction of interest, beamforming on the stored signals and signal comparison.

19. The apparatus according to claim 18, wherein the processing element comprises:
   a receiver modulator configured to adjust the received scattered modulated signals to form adjusted signals;
   a signal combiner configured to combine the adjusted signals to form a resultant signal; and
   a correlator configured to compare the resultant signal and a predicted transmitted signal.

20. The apparatus according to claim 15, wherein the receiver further comprises:
   a signal combiner configured to combine the received scattered modulated signals to form a resultant signal; and
   one or more processors configured for one or more directions of interest to perform beamforming while performing signal comparison between the resultant signal and a predicted transmitted signal.

21. The apparatus according to claim 15, wherein the receiver further comprises:
   a signal combiner configured to combine the received scattered modulated signals to form a resultant signal;
   a storage element configured to store snapshots of the resultant signal and output the stored resultant signal multiple times; and
   a processor configured to perform, for each direction of interest, beamforming while performing signal comparison between the resultant signal and a predicted transmitted signal with a signal processing means.

22. The apparatus according to claim 15, wherein the receiver further comprises one or more processors configured for one or more directions of interest to randomize the phases of the received scattered modulated signals and to perform signal comparison.

23. The apparatus according to claim 22, wherein each of the processing elements comprises:
   a receiver modulator configured to randomize phases of the received scattered modulated signals to form adjusted signals;
   a signal combiner configured to combine the adjusted signals to form a resultant signal;
   a first correlator configured to perform signal comparison between the resultant signal and a predicted received signal to form a first correlated signal; and
   a second correlator configured to perform signal comparison between the first correlated signal and a predicted transmitted signal.

24. The apparatus according to claim 15, wherein the receiver further comprises:
   a storage element configured to store snapshots of the received scattered modulated signals and outputting the stored signals multiple times; and
   a processor element configured to randomize phases of the received signals and to perform signal comparison for each direction of interest.

25. The apparatus of claim 24, wherein the processing element comprises:
a receiver modulator configured to randomize the phases of the stored signals to form adjusted signals;
a signal combiner configured to combine the adjusted signals to form a resultant signal;
a first correlator configured to compare the resultant signal and a predicted received signal to form a first correlated signal; and
a second correlator configured to compare the first correlated signal and a predicted transmitted signal.

26. A method for sensing remote objects comprising:
generating J carrier signals;
generating J statistically independent chip sequences, wherein each chip sequence comprises a plurality of chips, each chip having a random phase; and
independently modulating the J carrier signals with the J statically independent chip sequences, respectively, to generate J modulated signals, wherein each modulated signal comprises a plurality of chips, each chip having a random phase.

27. The method according to claim 26, wherein the J modulated signals are transmitted, the method further comprising:
receiving the transmitted modulated signals, wherein the transmitted modulated signals have been scattered by remote objects; and
performing beamforming and signal comparison on the received scattered modulated signals with one or more processors for one or more directions of interest.

28. The method according to claim 27, wherein, for the one or more processors, performing beamforming and signal comparison comprises:
adjusting the received scattered modulated signals to form adjusted signals;
combining the adjusted signals to form a resultant signal; and
performing signal comparison between the resultant signal and a predicted transmitted signal.

29. The method according to claim 26 wherein the J modulated signals are transmitted, the method further comprising:
receiving the transmitted modulated signals, wherein the transmitted modulated signals have been scattered by remote objects;
storing snapshots of the received scattered modulated signals;
outputting the stored signals multiple times; and
performing beamforming and signal comparison, for one or more directions of interest on the stored signals.

30. The method according to claim 29, wherein performing beamforming and signal comparison comprises:
adjusting the received scattered modulated signals to form adjusted signals;
combining the adjusted signals to form a resultant signal; and
performing signal comparison between the resultant signal and a predicted transmitted signal.

31. The method according to claim 26 wherein the J modulated signals are transmitted, the method further comprising:
receiving the transmitted modulated signals, wherein the transmitted modulated signals have been scattered by remote objects;
combining the received scattered modulated signals to form a resultant signal; and
performing beamforming on the resultant signal with one or more processors for one or more directions of interest, while performing signal comparison between the resultant signal and a predicted transmitted signal.

32. The method according to claim 26 wherein the J modulated signals are transmitted, the method further comprising:
receiving the transmitted modulated signals, wherein the transmitted modulated signals have been scattered by remote objects;
combining the received scattered signals to form a resultant signal;
storing snapshots of the resultant signal;
outputting the stored resultant signal multiple times; and
performing, for one or more directions of interest, beamforming on the resultant signal while performing signal comparison between the resultant signal and a predicted transmitted signal.

33. The method of claim 26 wherein the J modulated signals are transmitted, the method further comprising:
receiving the transmitted modulated signals, wherein the transmitted modulated signals have been scattered by remote objects; and
randomizing the phases of the received scattered modulated signals and performing signal comparison with one or more processors for one or more directions of interest.

34. The method according to claim 33, wherein, for each of the one or more processors, randomizing and performing signal comparison comprises:
performing modulation on the received scattered modulated signals to form adjusted signals;
combining the adjusted signals to form a resultant signal;
performing signal comparison between the resultant signal and a predicted received signal to form a correlated signal; and
performing signal comparison between the correlated signal and a predicted transmitted signal.

35. The method of claim 26 wherein the J modulated signals are transmitted, the method further comprising:
receiving the transmitted modulated signals, wherein the transmitted modulated signals have been scattered by remote objects;
storing snapshots of the received scattered modulated signals;
outputting the stored signals multiple times; and
randomizing phases of the stored signals and performing signal comparison, for one or more directions of interest, with a processor.

36. The method according to claim 35, wherein randomizing phases and performing signal comparison comprises:
performing modulation on the received scattered modulated signals to form adjusted signals;
combining the adjusted signals to form a resultant signal;
performing signal comparison between the resultant signal and a predicted received signal to form a correlated signal; and
performing signal comparison between the correlated signal and a predicted transmitted signal.

37. An apparatus for receiving modulated signals to detect remote objects, wherein the modulated signals have been transmitted by a transmitter wherein each modulated signal includes a plurality of chips, each chip having a random phase and wherein the modulated signals are scattered by remote objects, the receiver comprising:

receiver sensor elements to receive the scattered modulated signals; and one or more processing elements configured to perform beamforming for one or more directions of interest on the received scattered modulated signals and signal comparison.

38. The apparatus according to claim 37, wherein each of the processing elements comprises:

a receiver modulator configured to adjust the received scattered modulated signals to form adjusted signals;

a signal combiner configured to combine the adjusted signals to form a resultant signal; and a correlator configured to compare the resultant signal and a predicted transmitted signal.

39. An apparatus for receiving modulated signals to detect remote objects, wherein the modulated signals have been transmitted by a transmitter wherein each modulated signal includes a plurality of chips, each chip having a random phase and wherein the modulated signals are scattered by remote objects, the receiver comprising:

receiver sensor elements to receive the scattered modulated signals;

a storage element configured to store snapshots of the received scattered modulated signals and output the stored signals multiple times; and a processing element configured to perform, for one or more directions of interest, beamforming on the stored signals and signal comparison.

40. The apparatus according to claim 39, wherein the processing element comprises:

a receiver modulator configured to adjust the received scattered modulated signals to form adjusted signals;

a signal combiner configured to combine the adjusted signals to form a resultant signal; and a correlator configured to compare the resultant signal and a predicted transmitted signal.

41. An apparatus for receiving modulated signals to detect remote objects, wherein the modulated signals have been transmitted by a transmitter wherein each modulated signal includes a plurality of chips, each chip having a random phase and wherein the modulated signals are scattered by remote objects, the receiver comprising:

receiver sensor elements to receive the scattered modulated signals;

a signal combiner configured to combine the received scattered modulated signals to form a resultant signal; and one or more processors configured to simultaneously perform beamforming for one or more directions of interest while performing signal comparison between the resultant signal and a predicted transmitted signal.

42. An apparatus for receiving modulated signals to detect remote objects, wherein the modulated signals have been transmitted by a transmitter wherein each modulated signal includes a plurality of chips, each chip having a random phase and wherein the modulated signals are scattered by remote objects, the receiver comprising:

receiver sensor elements to receive the scattered modulated signals;

a signal combiner configured to combine the received scattered modulated signals to form a resultant signal;

a storage element configured to store snapshots of the resultant signal and output the stored resultant signal multiple times; and a processor configured to perform, for one or more directions of interest, beamforming while performing signal comparison between the resultant signal and a predicted transmitted signal.

43. An apparatus for receiving modulated signals to detect remote objects, wherein the modulated signals have been transmitted by a transmitter wherein each modulated signal includes a plurality of chips, each chip having a random phase and wherein the modulated signals are scattered by remote objects, the receiver comprising:

receiver sensor elements to receive the scattered modulated signals; and one or more processing elements configured for one or more directions of interest to randomize phases of the received scattered modulated signals and to perform signal comparison.

44. The apparatus according to claim 43, wherein each of the processing elements comprises:

a receiver modulator configured to randomize phases of the received scattered modulated signals to form adjusted signals;

a signal combiner configured to combine the adjusted signals to form a resultant signal;

a first correlator configured to compare the resultant signal and a predicted received signal to form a first correlated signal; and a second correlator configured to compare the first correlated signal and a predicted transmitted signal.

45. An apparatus for receiving modulated signals to detect remote objects, wherein the modulated signals have been transmitted by a transmitter wherein each modulated signal includes a plurality of chips, each chip having a random phase and wherein the modulated signals are scattered by remote objects, the receiver comprising:

receiver sensor elements to receive the scattered modulated signals;

a storage element configured to store snapshots of the received scattered modulated signals and output the stored signals multiple times; and a processing element configured to randomize phases of the received signals and to perform signal comparison for one or more directions of interest.

46. The apparatus of claim 45, wherein the processing element comprises:

a receiver modulator configured to randomize phases of the stored signals to form adjusted signals;

a signal combiner configured to combine the adjusted signals to form a resultant signal;

a first correlator configured to compare the resultant signal and a predicted received signal to form a first correlated signal; and a second correlator configured to compare the first correlated signal and a predicted transmitted signal.

47. A method for sensing remote objects comprising:

receiving transmitted modulated signals, wherein the transmitted modulated signals have been transmitted by a transmitter and each transmitted modulated signal includes a plurality of chips, each chip having a random phase and wherein the modulated signals are scattered by remote objects;

performing beamforming and signal comparison on the received scattered modulated signals with one or more processors for one or more directions of interest.

48. The method according to claim 47, wherein, for each of the one or more processors, performing beamforming and signal comparison comprises:

adjusting the received scattered modulated signals to form adjusted signals;

combining the adjusted signals to form a resultant signal; and performing signal comparison between the resultant signal and a predicted transmitted signal.

49. A method for sensing remote objects comprising:

receiving transmitted modulated signals, wherein the transmitted modulated signals have been transmitted by a transmitter and each transmitted modulated signal includes a plurality of chips, each chip having a random phase and wherein the modulated signals are scattered by remote objects;

storing snapshots of the received scattered modulated signals;

outputting the stored signals multiple times; and performing beamforming and signal comparison on the stored signals, for one or more directions of interest.

50. The method according to claim 49, wherein, performing beamforming and signal comparison comprises:

adjusting the received scattered modulated signals to form adjusted signals;

combining the adjusted signals to form a resultant signal; and performing signal comparison between the resultant signal and a predicted transmitted signal.

51. A method for sensing remote objects comprising:

receiving transmitted modulated signals, wherein the transmitted modulated signals have been transmitted by a transmitter and includes a plurality of chips, each chip having a random phase and wherein the modulated signals are scattered by remote objects;

combining the received scattered modulated signals to form a resultant signal; and performing beamforming on the resultant signal with one or more processors for one or more directions of interest, while performing signal comparison between the resultant signal and a predicted transmitted signal.

52. A method for sensing remote objects comprising:

receiving transmitted modulated signals, wherein the transmitted modulated signals have been transmitted by a transmitter and each transmitted modulator signal includes a plurality of chips, each chip having a random phase and wherein the modulated signals are scattered by remote objects;

combining the received scattered signals to form a resultant signal;

storing snapshots of the resultant signal;

outputting the stored resultant signal multiple times; and performing, for one or more directions of interest, beamforming on the resultant signal while performing signal comparison between the resultant signal and a predicted transmitted signal.

53. A method for sensing remote objects comprising:

receiving transmitted modulated signals, wherein the transmitted modulated signals have been transmitted by a transmitter and each transmitted modulated signal includes a plurality of chips, each chip having a random phase and wherein the modulated signals are scattered by remote objects; and randomizing phases of the received scattered modulated signals and performing signal comparison with one or more processors for one or more directions of interest.

54. The method according to claim 53, wherein, for each of the one or more processors, randomizing and performing signal comparison comprises:

randomizing phases of the received scattered modulated signals to form adjusted signals;

combining the adjusted signals to form a resultant signal;

performing signal comparison between the resultant signal and a predicted received signal to form a correlated signal; and performing signal comparison between the correlated signal and a predicted transmitted signal.

55. A method for sensing remote objects comprising:

receiving transmitted modulated signals, wherein the transmitted modulated signals have been transmitted by a transmitter and each transmitted modulated signal includes a plurality of chips, each chip having a random phase and wherein the modulated signals are scattered by remote objects;

storing snapshots of the received scattered modulated signals;

outputting the stored signals multiple times; and randomizing phases of the stored signals and performing signal comparison, for one or more directions of interest, with a processor.

56. The method according to claim 55, wherein, randomizing and performing signal comparison comprises:

randomizing phases of the received scattered modulated signals to form adjusted signals;

combining the adjusted signals to form a resultant signal;

performing signal comparison between the resultant signal and a predicted received signal to form a correlated signal; and performing signal comparison between the correlated signal and a predicted transmitted signal.

* * * * *

UNITED STATES PATENT AND TRADEMARK OFFICE
CERTIFICATE OF CORRECTION

PATENT NO. : 6,608,588 B2
DATED : August 19, 2003
INVENTOR(S) : Carl M. Elam

It is certified that error appears in the above-identified patent and that said Letters Patent is hereby corrected as shown below:

Title page,
Item [57], ABSTRACT,
Line 3, "simultaneous" should read -- simultaneously --

Column 13,
Line 19, "statically" should read -- statistically --.
Line 52, "interest on" should read -- interest, on --.

Signed and Sealed this

Thirteenth Day of July, 2004

JON W. DUDAS
*Acting Director of the United States Patent and Trademark Office*